(12) United States Patent
Schultz et al.

(10) Patent No.: US 11,080,911 B2
(45) Date of Patent: \*Aug. 3, 2021

(54) MOSAIC OBLIQUE IMAGES AND SYSTEMS AND METHODS OF MAKING AND USING SAME

(71) Applicant: Pictometry International Corp., Rochester, NY (US)

(72) Inventors: Stephen Schultz, West Henrietta, NY (US); Frank Giuffrida, Honeoye Falls, NY (US); Robert Gray, Canandiagua, NY (US)

(73) Assignee: Pictometry International Corp., Rochester, NY (US)

( \* ) Notice: Subject to any disclaimer, the term of this patent is extended or adjusted under 35 U.S.C. 154(b) by 65 days.

This patent is subject to a terminal disclaimer.

(21) Appl. No.: 16/694,370

(22) Filed: Nov. 25, 2019

(65) Prior Publication Data

US 2020/0090390 A1 Mar. 19, 2020

Related U.S. Application Data

(63) Continuation of application No. 15/965,222, filed on Apr. 27, 2018, now Pat. No. 10,489,953, which is a
(Continued)

(51) Int. Cl.
*G06K 9/36* (2006.01)
*G06T 11/60* (2006.01)
(Continued)

(52) U.S. Cl.
CPC ............ *G06T 11/60* (2013.01); *G06T 3/0031* (2013.01); *G06T 3/0093* (2013.01);
(Continued)

(58) Field of Classification Search
CPC ............ G06K 9/00624; G06K 9/0063; G06K 9/00637; G06K 2009/2045; G06T 3/0031;
(Continued)

(56) References Cited

U.S. PATENT DOCUMENTS 2,273,876 A 2/1942 Lutz et al.
2,791,151 A \* 5/1957 Pennington ............ G01C 11/00
353/6
(Continued)

FOREIGN PATENT DOCUMENTS

AT 331204 T 7/2006
BR 0316110 9/2005
(Continued)

OTHER PUBLICATIONS

Ackermann, Prospects of Kinematic GPS Aerial Triangulation, ITC Journal, 1992.
(Continued)

*Primary Examiner* — Eric Rush
(74) *Attorney, Agent, or Firm* — Dunlap Codding, P.C.

(57) ABSTRACT

Systems and methods for creating oblique-mosaic image(s) for geographical area(s) are disclosed, including a computer system running software that when executed causes the system to create a mathematical model of a sensor of a virtual camera having an elevation greater than an elevation of a desired geographical area to be imaged, the mathematical model having an oblique-mosaic pixel map; determine surface locations for pixels included in the oblique-mosaic pixel map; select source oblique images of the surface locations of the pixels captured at an oblique angle and compass direction similar to an oblique angle and compass direction of the virtual camera; and reproject source oblique image pixels for pixels included in the oblique-mosaic pixel map such that reprojected pixels have differing sizes deter- (Continued)

mined by matching projections from the virtual camera so as to present an oblique appearance, and thereby create the oblique-mosaic image of the desired geographical area.

26 Claims, 5 Drawing Sheets

Related U.S. Application Data continuation of application No. 15/797,679, filed on Oct. 30, 2017, now Pat. No. 9,959,653, which is a continuation of application No. 15/253,135, filed on Aug. 31, 2016, now Pat. No. 9,805,489, which is a continuation of application No. 14/152,366, filed on Jan. 10, 2014, now Pat. No. 9,437,029, which is a continuation of application No. 13/778,708, filed on Feb. 27, 2013, now Pat. No. 8,660,382, which is a continuation of application No. 13/317,499, filed on Oct. 19, 2011, now Pat. No. 8,452,125, which is a continuation of application No. 12/930,546, filed on Jan. 10, 2011, now Pat. No. 8,081,841, which is a continuation of application No. 11/847,125, filed on Aug. 29, 2007, now Pat. No. 7,873,238.

(60) Provisional application No. 60/840,992, filed on Aug. 30, 2006.

(51) Int. Cl.
  *G06T 3/00*  (2006.01)
  *G06T 7/00*  (2017.01)
  *G06T 7/50*  (2017.01)
  *G06T 3/40*  (2006.01)

(52) U.S. Cl.
  CPC ............. *G06T 3/4038* (2013.01); *G06T 7/50* (2017.01); *G06T 7/97* (2017.01); *G06T 2207/30176* (2013.01)

(58) Field of Classification Search
  CPC ..... G06T 3/005; G06T 3/0093; G06T 3/4038; G06T 7/30; G06T 7/38; G06T 7/50; G06T 7/55; G06T 7/97; G06T 11/60; G06T 2207/10032; G06T 2207/30176
  USPC ........ 382/100, 154, 284, 285, 294; 345/629, 345/646; 348/144, 147
  See application file for complete search history.

(56) References Cited

U.S. PATENT DOCUMENTS

| | | |
|---|---|---|
| 3,153,784 A | 10/1964 | Petrides et al. |
| 3,594,556 A | 7/1971 | Edwards |
| 3,614,410 A | 10/1971 | Bailey |
| 3,621,326 A | 11/1971 | Hobrough |
| 3,661,061 A | 5/1972 | Tokarz |
| 3,716,669 A | 2/1973 | Watanabe et al. |
| 3,725,563 A | 4/1973 | Woycechowsky |
| 3,864,513 A | 2/1975 | Halajian et al. |
| 3,866,602 A | 2/1975 | Furihata |
| 3,877,799 A | 4/1975 | O'Donnell |
| 4,015,080 A | 3/1977 | Moore-Searson |
| 4,044,879 A | 8/1977 | Stahl |
| 4,184,711 A | 1/1980 | Wakimoto |
| 4,240,108 A | 12/1980 | Levy |
| 4,281,354 A | 7/1981 | Conte |
| 4,344,683 A | 8/1982 | Stemme |
| 4,360,876 A | 11/1982 | Girault et al. |
| 4,382,678 A | 5/1983 | Thompson et al. |
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | Mclaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 5,034,812 A | 7/1991 | Rawlings |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,402,170 A | 3/1995 | Parulski et al. |
| 5,414,462 A | 5/1995 | Veatch |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,604,534 A | 2/1997 | Hedges et al. |
| 5,606,627 A * | 2/1997 | Kuo .................... G06T 7/593 382/294 |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,963,664 A | 10/1999 | Kumar et al. |
| 6,037,945 A | 3/2000 | Loveland |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 12/2000 | Szeliski et al. |
| 6,167,300 A | 12/2000 | Cherepenin et al. |

(56) References Cited

U.S. PATENT DOCUMENTS

| | | |
|---|---|---|
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |
| 6,747,686 B1 | 6/2004 | Bennett |
| 6,810,383 B1 | 10/2004 | Loveland |
| 6,816,819 B1 | 11/2004 | Loveland |
| 6,826,539 B2 | 11/2004 | Loveland |
| 6,829,584 B2 | 12/2004 | Loveland |
| 6,834,128 B1 | 12/2004 | Altunbasak et al. |
| 6,876,763 B2 | 4/2005 | Sorek et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,133,551 B2 | 11/2006 | Chen |
| 7,142,984 B2 | 11/2006 | Rahmes et al. |
| 7,184,072 B1 | 2/2007 | Loewen et al. |
| 7,233,691 B2 | 6/2007 | Setterholm |
| 7,262,790 B2 | 8/2007 | Bakewell |
| 7,348,895 B2 | 3/2008 | Lagassey |
| 7,509,241 B2 | 3/2009 | Guo |
| 7,728,833 B2 | 6/2010 | Verma |
| 7,832,267 B2 | 11/2010 | Woro |
| 7,844,499 B2 | 11/2010 | Yahiro |
| 7,944,547 B2 * | 5/2011 | Wang ............... G06T 17/05 356/4.01 |
| 8,078,396 B2 | 12/2011 | Meadow |
| 8,705,843 B2 | 4/2014 | Lieckfeldt |
| 2002/0041328 A1 | 4/2002 | LeCompte et al. |
| 2002/0041717 A1 | 4/2002 | Murata et al. |
| 2002/0114536 A1 | 8/2002 | Xiong et al. |
| 2003/0014224 A1 | 1/2003 | Guo et al. |
| 2003/0043824 A1 | 3/2003 | Remboski et al. |
| 2003/0088362 A1 | 5/2003 | Melero et al. |
| 2003/0164962 A1 | 9/2003 | Nims et al. |
| 2003/0214585 A1 | 11/2003 | Bakewell |
| 2004/0105090 A1 | 6/2004 | Schultz et al. |
| 2004/0167709 A1 | 8/2004 | Smitherman et al. |
| 2005/0073241 A1 | 4/2005 | Yamauchi et al. |
| 2005/0088251 A1 | 4/2005 | Matsumoto |
| 2005/0089213 A1 * | 4/2005 | Geng ............... G06K 9/00214 382/154 |
| 2005/0169521 A1 | 8/2005 | Hel-Or |
| 2006/0028550 A1 | 2/2006 | Palmer et al. |
| 2006/0092043 A1 | 5/2006 | Lagassey |
| 2006/0215935 A1 * | 9/2006 | Oldroyd ............... G06T 7/32 382/294 |
| 2996/0238383 | 10/2006 | Kimchi et al. |
| 2006/0250515 A1 | 11/2006 | Koseki et al. |
| 2007/0024612 A1 | 2/2007 | Balfour |
| 2007/0046448 A1 | 3/2007 | Smitherman |
| 2007/0237420 A1 | 10/2007 | Steedly et al. |
| 2008/0120031 A1 | 5/2008 | Rosenfeld et al. |
| 2008/0123994 A1 | 5/2008 | Schultz et al. |
| 2008/0158256 A1 | 7/2008 | Russell et al. |
| 2008/0279447 A1 * | 11/2008 | Friedlander ............... G06T 7/80 382/154 |
| 2009/0177458 A1 | 7/2009 | Hochart et al. |
| 2009/0208095 A1 | 8/2009 | Zebedin |
| 2009/0304227 A1 | 12/2009 | Kennedy et al. |
| 2010/0296693 A1 | 11/2010 | Thornberry et al. |
| 2011/0033110 A1 | 2/2011 | Shimamura et al. |
| 2013/0246204 A1 | 9/2013 | Thornberry et al. |

FOREIGN PATENT DOCUMENTS

| | | |
|---|---|---|
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 1010966 | 2/1999 |
| EP | 1180967 | 2/2002 |
| EP | 1 223 750 A2 | 7/2002 |
| EP | 1418402 | 5/2004 |
| EP | 1696204 | 8/2006 |
| ES | 2266704 T | 3/2007 |
| JP | 2000215311 A | 8/2000 |
| JP | 2003/317089 A | 11/2003 |
| MX | PA05004987 | 2/2006 |
| WO | WO99/18732 | 4/1999 |
| WO | WO/2000/053090 | 9/2000 |
| WO | WO/2001/001347 A1 | 4/2001 |
| WO | WO/2004/044692 | 5/2004 |
| WO | WO/2005/088251 | 9/2005 |
| WO | WO/2008/028040 | 3/2008 |

OTHER PUBLICATIONS

Ciampa, John A., "Pictometry Digital Video Mapping", SPIE, vol. 2598, pp. 140-148, 1995.

Ciampa, J. A., Oversee, Presented at Reconstruction After Urban earthquakes, Buffalo, NY, 1989.

Dunford et al., Remote Sensing for Rural Development Planning in Africa, The Journal for the International Institute for Aerial Survey and Earth Sciences, 2:99-108, 1983.

Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.

Konecny, G., "Issues of Digital Mapping", Leibniz University Hannover, Germany, GIS Ostrava 2008, Ostrava Jan. 27-30, 2008, pp. 1-8.

Konecny, G., "Analytical Aerial Triangulation with Convergent Photography", Department of Surveying Engineering, University of New Brunswick, pp. 37-57, 1966.

Konecny, G., "Interior Orientation and Convergent Photography", Photogrammetric Engineering, pp. 625-634, 1965.

Graham, Lee A., "Airborne Video for Near-Real-Time Vegetation Mapping", Journal of Forestry, 8:28-32, 1993.

Graham, Horita TRG-50 SMPTE Time-Code Reader, Generator, Window Inserter, 1990.

Hess, L.L, et al., "Geocoded Digital Videography for Validation of Land Cover Mapping in the Amazon Basin", International Journal of Remote Sensing, vol. 23, No. 7, pp. 1527-1555, 2002.

Hinthorne, J., et al., "Image Processing in The Grass GIS", Geoscience and Remote Sensing Symposium, 4:2227-2229, 1991.

Imhof, Ralph K., "Mapping from Oblique Photographs", Manual of Photogrammetry, Chapter 18, 1966.

Jensen, John R., Introductory Digital Image Processing: A Remote Sensing Perspective, Prentice-Hall, 1986; 399 pages.

Lapine, Lewis A., "Practical Photogrammetric Control by Kinematic GPS", GPS World, 1(3):44-49, 1990.

Lapine, Lewis A., Airborne Kinematic GPS Positioning for Photogrammetry—The Determination of the Camera Exposure Station, Silver Spring, MD, 11 pages, at least as early as 2000.

Linden et al., Airborne Video Automated Processing, US Forest Service Internal report, Fort Collins, CO, 1993.

Myhre, Dick, "Airborne Video System Users Guide", USDA Forest Service, Forest Pest Management Applications Group, published by Management Assistance Corporation of America, 6 pages, 1992.

Myhre et al., "An Airborne Video System Developed Within Forest Pest Management—Status and Activities", 10 pages, 1992.

Myhre et al., "Airborne Videography—A Potential Tool for Resource Managers"—Proceedings: Resource Technology 90, 2nd International Symposium on Advanced Technology in Natural Resource Management, 5 pages, 1990.

(56) References Cited

OTHER PUBLICATIONS

Myhre et al., Aerial Photography for Forest Pest Management, Proceedings of Second Forest Service Remote Sensing Applications Conference, Slidell, Louisiana, 153-162, 1988.

Myhre et al., "Airborne Video Technology", Forest Pest Management/Methods Application Group, Fort Collins, CO, pp. 1-6, at least as early as Jul. 30, 2006.

Norton-Griffiths et al., 1982. "Sample surveys from light aircraft combining visual observations and very large scale color photography". University of Arizona Remote Sensing Newsletter 82-2:1-4.

Norton-Griffiths et al., "Aerial Point Sampling for Land Use Surveys", Journal of Biogeography, 15:149-156, 1988.

Novak, Rectification of Digital Imagery, Photogrammetric Engineering and Remote Sensing, 339-344, 1992.

Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.

Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.

Slaymaker, et al., "Cost-effective Determination of Biomass from Aerial Images", Lecture Notes In Computer Science, 1737:67-76, http://portal.acm.org/citation.cfm?id=648004.743267&coll=GUIDE&dl=, 1999.

Slaymaker, et al., "A System for Real-time Generation of Georeferenced Terrain Models", 4232A-08, SPIE Enabling Technologies for Law Enforcement Boston, MA, ftp://vis-ftp.cs.umass.edu/Papers/schultz/spie2000.pdf, 2000.

Slaymaker, et al.,"Integrating Small Format Aerial Photography, Videography, and a Laser Profiler for Environmental Monitoring", In ISPRS WG III/1 Workshop on Integrated Sensor Calibration and Orientation, Portland, Maine, 1999.

Slaymaker, et al., "Calculating Forest Biomass With Small Format Aerial Photography, Videography And A Profiling Laser", In Proceedings of the 17th Biennial Workshop on Color Photography and Videography in Resource Assessment, Reno, NV, 1999.

Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.

Star et al., "Geographic Information Systems an Introduction", Prentice-Hall, 1990.

Tomasi et al., "Shape and Motion from Image Streams: a Factorization Method"—Full Report on the Orthographic Case, pp. 9795-9802, 1992.

Warren, Fire Mapping with the Fire Mousetrap, Aviation and Fire Management, Advanced Electronics System Development Group, USDA Forest Service, 1986.

Welch, R., "Desktop Mapping with Personal Computers", Photogrammetric Engineering and Remote Sensing, 1651-1662, 1989.

Westervelt, James, "Introduction to GRASS 4", pp. 1-25, 1991.

"RGB Spectrum Videographics Report, vol. 4, No. 1, McDonnell Douglas Integrates RGB Spectrum Systems in Helicopter Simulators", pp. 1-6, 1995.

RGB "Computer Wall", RGB Spectrum, 4 pages, 1995.

"The First Scan Converter with Digital Video Output", Introducing . . . The RGB/Videolink 1700D-1, RGB Spectrum, 2 pages, 1995.

ERDAS Field Guide, Version 7.4, A Manual for a commercial image processing system, 1990.

"Image Measurement and Aerial Photography", Magazine for all branches of Photogrammetry and its fringe areas, Organ of the German Photogrammetry Association, Berlin-Wilmersdorf, No. 1, 1958.

"Airvideo Analysis", MicroImages, Inc., Lincoln, NE, 1 page, Dec. 1992.

Zhu, Zhigang, Hanson, Allen R., "Mosaic-Based 3D Scene Representation and Rendering", Image Processing, 2005, ICIP 2005, IEEE International Conference on 1(2005).

Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.

Mostafa, et al., "Ground Accuracy from Directly Georeferenced Imagery", Published in GIM International vol. 14 N. 12 Dec. 2000.

Mostafa, et al., "Airborne Direct Georeferencing of Frame Imagery: An Error Budget", The $3^{rd}$ International Symposium on Mobile Mapping Technology, Cairo, Egypt, Jan. 3-5, 2001.

Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.

Mostafa, et al., "Airborne DGPS Without Dedicated Base Stations for Mapping Applications", Proceedings of ION-GPS 2001, Salt Lake City, Utah, USA, Sep. 11-14.

Mostafa, "ISAT Direct Exterior Orientation QA/QC Strategy Using POS Data", Proceedings of OEEPE Workshop: Integrated Sensor Orientation, Hanover, Germany, Sep. 17-18, 2001.

Mostafa, "Camera/IMU Boresight Calibration: New Advances and Performance Analysis", Proceedings of the ASPRS Annual Meeting, Washington, D.C., Apr. 21-26, 2002.

Hiatt, "Sensor Integration Aids Mapping at Ground Zero", Photogrammetric Engineering and Remote Sensing, Sep. 2002, p. 877-878.

Mostafa, "Precision Aircraft GPS Positioning Using CORS", Photogrammetric Engineering and Remote Sensing, Nov. 2002, p. 1125-1126.

Mostafa, et al., System Performance Analysis of INS/DGPS Integrated System for Mobile Mapping System (MMS), Department of Geomatics Engineering, University of Calgary, Commission VI, WG VI/4, Mar. 2004.

Artes F., & Hutton, J., "GPS and Inertial Navigation Delivering", Sep. 2005, GEOconnexion International Magazine, p. 52-53, Sep. 2005.

"POS AV" Applanix, Product Outline, airborne@applanix.com, 3 pages, Mar. 28, 2007.

POSTrack, "Factsheet", Applanix, Ontario, Canada, www.applanix.com, Mar. 2007.

POS AV "Digital Frame Camera Applications", 3001 Inc., Brochure, 2007.

POS AV "Digital Scanner Applications", Earthdata Brochure, Mar. 2007.

POS AV "Film Camera Applications" AeroMap Brochure, Mar. 2007.

POS AV "LIDAR Applications" MD Atlantic Brochure, Mar. 2007.

POS AV "OEM System Specifications", 2005.

POS AV "Synthetic Aperture Radar Applications", Overview, Orbisat Brochure, Mar. 2007.

"POSTrack V5 Specifications" 2005.

"Remote Sensing for Resource Inventory Planning and Monitoring", Proceeding of the Second Forest Service Remote Sensing Applications Conference—Slidell, Louisiana and NSTL, Mississippi, Apr. 11-15, 1988.

"Protecting Natural Resources with Remote Sensing", Proceeding of the Third Forest Service Remote Sensing Applications Conference—Apr. 9-13, 1990.

Heipke, et al, "Test Goals and Test Set Up for the OEEPE Test—Integrated Sensor Orientation", 1999.

Kumar, et al., "Registration of Video to Georeferenced Imagery", Sarnoff Corporation, CN5300, Princeton, NJ, 1998.

McConnel, Proceedings Aerial Pest Detection and Monitoring Workshop—1994.pdf, USDA Forest Service Forest Pest Management, Northern Region, Intermountain region, Forest Insects and Diseases, Pacific Northwest Region. 1994.

"Standards for Digital Orthophotos", National Mapping Program Technical Instructions, US Department of the Interior, Dec. 1996.

Tao, "Mobile Mapping Technology for Road Network Data Acquisition", Journal of Geospatial Engineering, vol. 2, No. 2, pp. 1-13, 2000.

"Mobile Mapping Systems Lesson 4", Lesson 4 SURE 382 Geographic Information Systems II, pp. 1-29, Jul. 2, 2006.

Konecny, G., "Mechanische Radialtriangulation mit Konvergentaufnahmen", Bildmessung und Luftbildwesen, 1958, Nr. 1.

(56) References Cited

OTHER PUBLICATIONS

Myhre, "ASPRS/ACSM/RT 92" Technical papers, Washington, D.C., vol. 5 Resource Technology 92, Aug. 3-8, 1992.
Rattigan, "Towns get new view from above," *The Boston Globe*, Sep. 5, 2002.
Mostafa, et al., "Digital image georeferencing from a multiple camera system by GPS/INS," *ISP RS Journal of Photogrammetry & Remote Sensing*, 56(I): 1-12, Jun. 2001.
Dillow, "Grin, or bare it, for aerial shot," *Orange County Register* (California), Feb. 25, 2001.
Anonymous, "Live automatic coordinates for aerial images," *Advanced Imaging*, 12(6):51, Jun. 1997.
Anonymous, "Pictometry and US Geological Survey announce—Cooperative Research and Development Agreement," Press Release published Oct. 20, 1999.
Miller, "Digital software gives small Arlington the Big Picture," *Government Computer NewsState & Local*, 7(12), Dec. 2001.
Garrett, "Pictometry: Aerial photography on steroids," *Law Enforcement Technology* 29(7):114-116, Jul. 2002.
Weaver, "County gets an eyeful," *The Post-Standard* (Syracuse, NY), May 18, 2002.
Reed, "Firm gets latitude to map O.C. in 3D," *Orange County Register* (California), Sep. 27, 2000.
Reyes, "Orange County freezes ambitious aerial photography project," *Los Angeles Times*, Oct. 16, 2000.
Aerowest Pricelist of Geodata as of Oct. 21, 2005 and translations to English 3 pages.
www.archive.org Web site showing archive of German AeroDach Web Site http://www.aerodach.de from Jun. 13, 2004 (retrieved Sep. 20, 2012) and translations to English 4 pages.
AeroDach®Online Roof Evaluation Standard Delivery Format and 3D Data File: Document Version 01.00.2002 with publication in 2002, 13 pages.
Noronha et al., "Detection and Modeling of Building from Multiple Aerial Images," Institute for Robotics and Intelligent Systems, University of Southern California, Nov. 27, 2001, 32 pages.
Applicad Reports dated Nov. 25, 1999-Mar. 9, 2005, 50 pages.
Applicad Online Product Bulletin archive from Jan. 7, 2003, 4 pages.
Applicad Sorcerer Guide, Version 3, Sep. 8, 1999, 142 pages.
Xactimate Claims Estimating Software archive from Feb. 12, 2010, 8 pages.
Bignone et al, Automatic Extraction of Generic House Roofs from High Resolution Aerial Imagery, Communication Technology Laboratory, Swiss Federal Institute of Technology ETH, CH-8092 Zurich, Switzerland, 12 pages, 1996.
Geospan 2007 Job proposal.
Greening et al., Commercial Applications of GPS-Assisted Photogrammetry, Presented at GIS/LIS Annual Conference and Exposition, Phoenix, AZ, Oct. 1994.
Applanix Corp, Robust, Precise Position and Orientation Solutions, POS/AV & POS/DG Installation & Operation Manual, Redefining the way you survey, May 19, 1999, Ontario, Canada.
Applanix Corp, Robust, Precise Position and Orientation Solutions, POS/AV V4 Ethernet & Disk Logging ICD, Redefining the way you survey, Revision 3, Apr. 18, 2001, Ontario, Canada.
European Patent Office, Extended European Search Report regarding Patent App. No. 07814579.4, Publication No. EP2057585, dated Feb. 8, 2013.
Applicant, Response to Extended European Search Report regarding Patent App. No. 07814579.4, Publication No. EP2057585, dated Jun. 18, 2014.
Okamoto et al., "Development of Parking Assistance System Using Virtual Viewpoint Image Synthesis", Its World Congress, XX, XX, Nov. 1, 2000.
Canadian Intellectual Property Office, Office Action regarding Canadian Patent Application No. 2,662,355, dated Feb. 9, 2012.
Applicant, Response to Feb. 9, 2012 Office Action regarding Canadian Patent Application Number 2,662,355, dated Aug. 8, 2012.
Canadian Intellectual Property Office, Office Action regarding Canadian Patent Application No. 2,662,355, dated Jan. 11, 2013.
Applicant, Response to Jan. 11, 2013 Office Action regarding Canadian Patent Application Number 2,662,355, dated Jul. 11, 2013.
Canadian Intellectual Property Office, Notice of Allowance regarding Canadian Patent Application No. 2,662,355, dated Aug. 21, 2013.
Japan Patent Office, Office Action regarding Japanese Patent Application No. 2009-526912, dated Dec. 2011.
International Search Authority/US, International Search Report and Written Opinion regarding application PCT/US2007/077242, dated Aug. 22, 2008.
European Patent Office, Examination Report regarding Patent App. No. 07814579.4, Publication No. EP2057585, dated Jan. 19, 2018.
Pictometry International Corp., Response to European Patent Office dated Jan. 19, 2018 Examination Report regarding European Patent App. No. 07814579.4, Publication No. EP2057585, filed Nov. 20, 2018.
Pictometry International Corp., Response to European Patent Office dated Apr. 10, 2019 Communication regarding European Patent App. No. 07814579.4, Publication No. EP2057585, filed Aug. 20, 2019.

\* cited by examiner

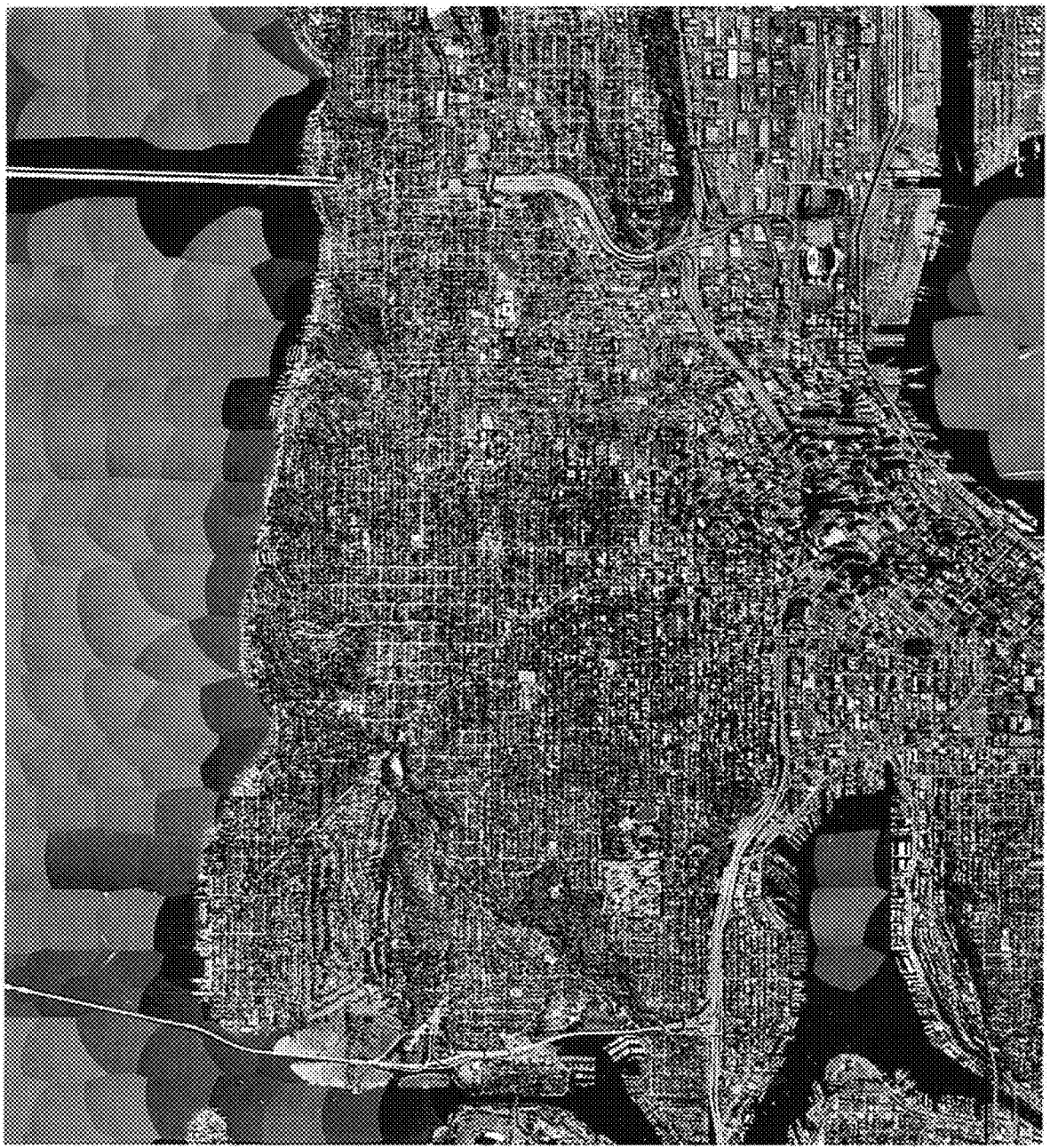
FIG. 3A    Oblique-Rectified

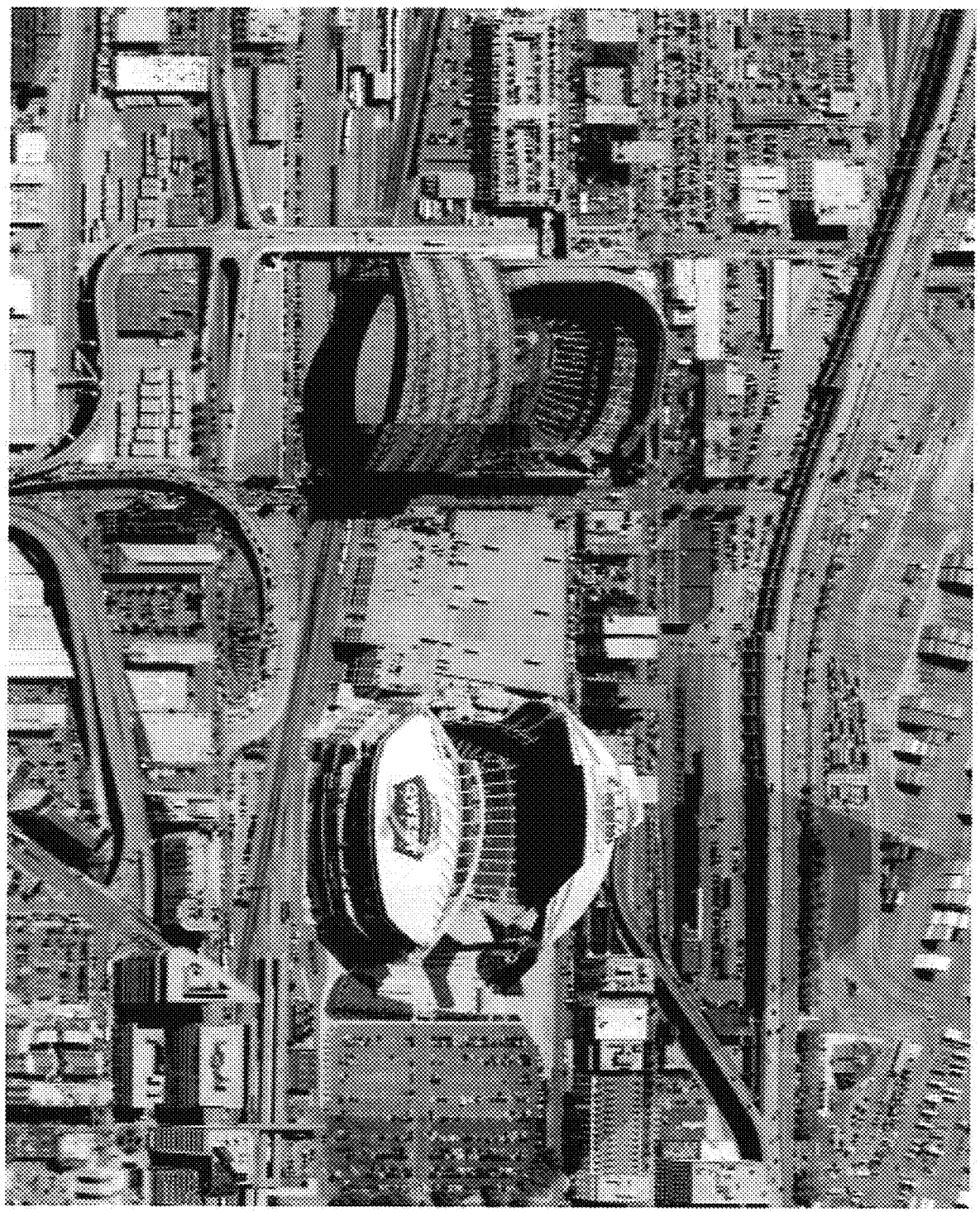
FIG. 3B  Oblique-Rectified Close-up

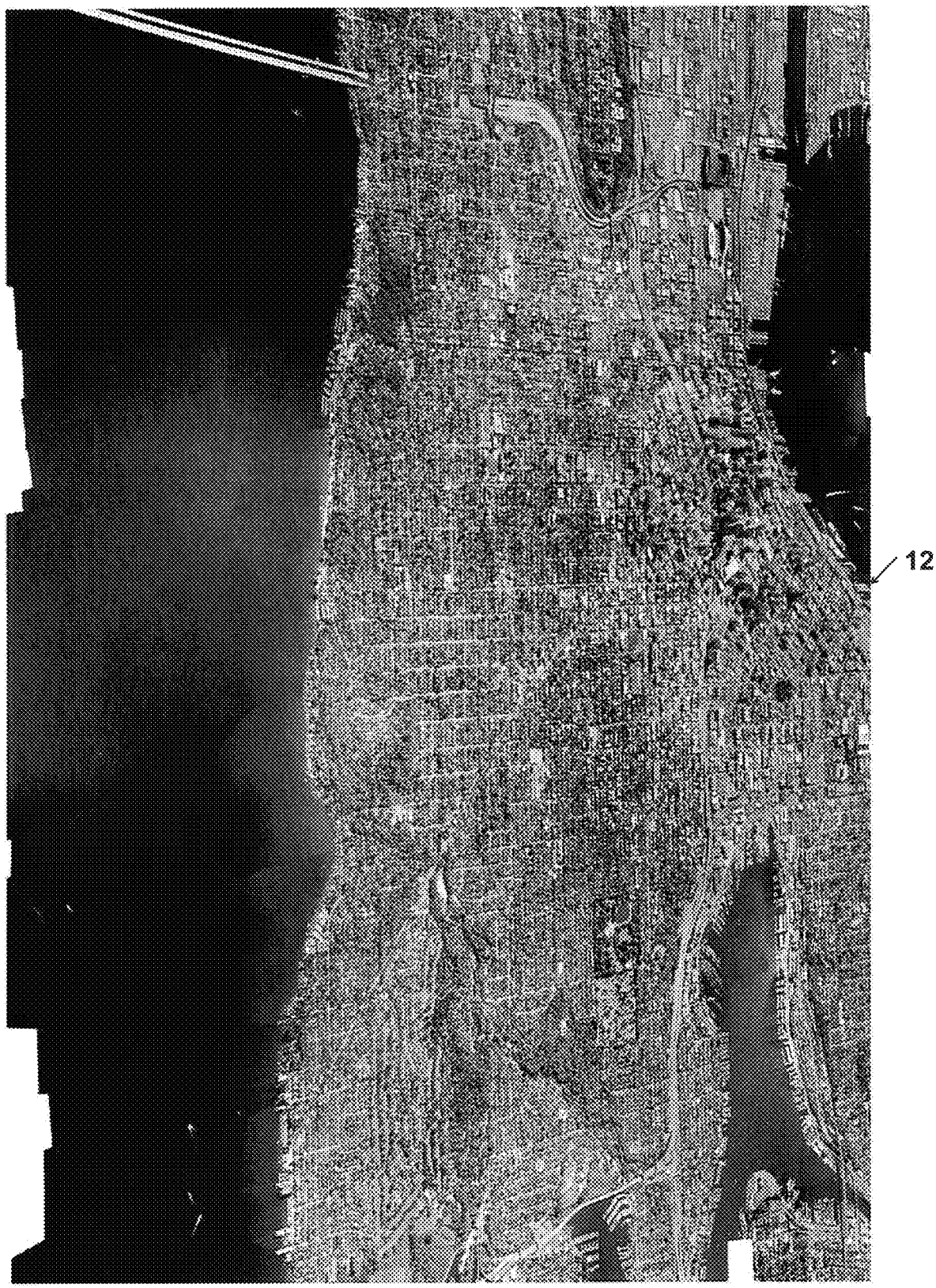
Fig. 4A  Oblique Mosaic

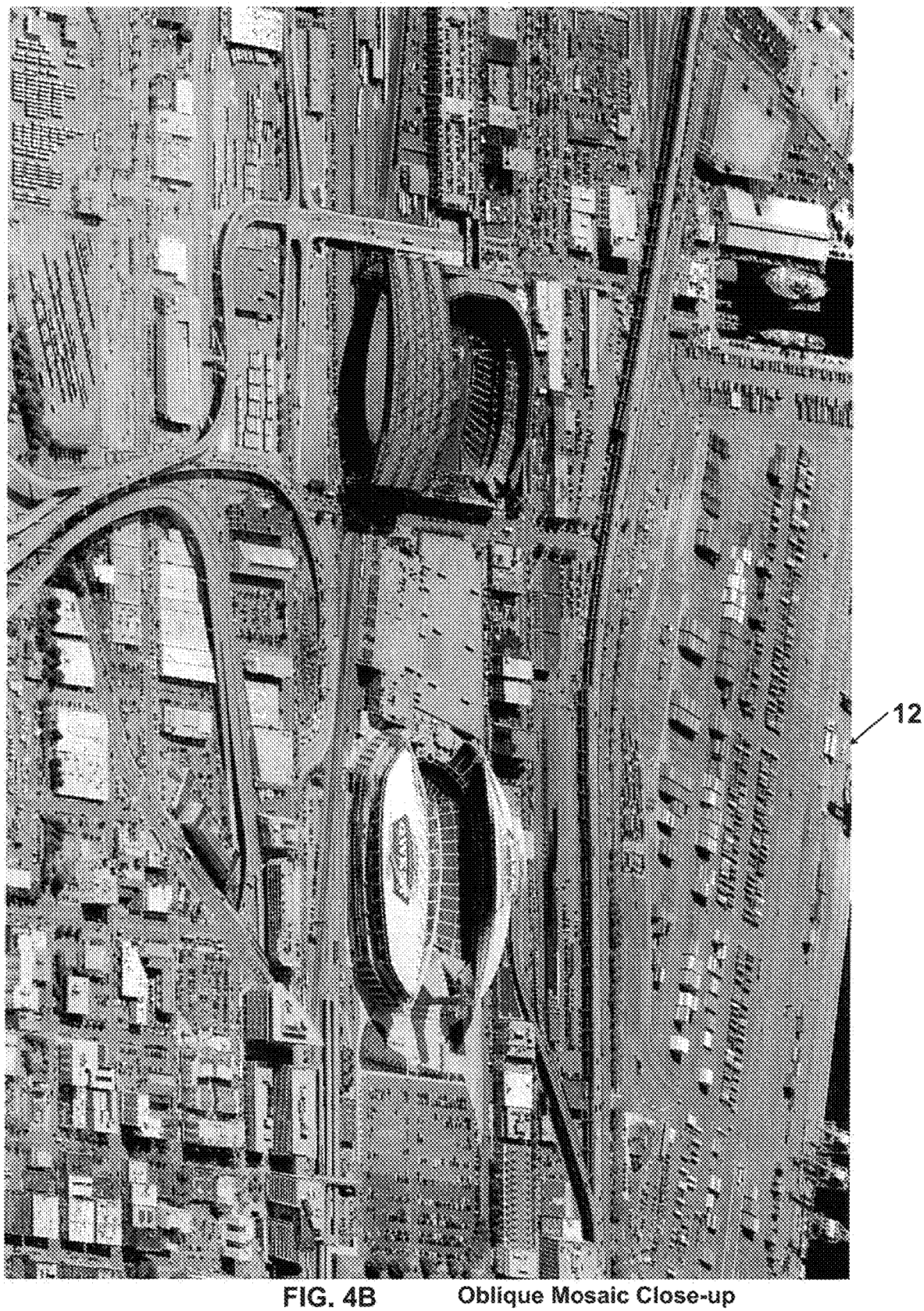
FIG. 4B  Oblique Mosaic Close-up

MOSAIC OBLIQUE IMAGES AND SYSTEMS AND METHODS OF MAKING AND USING SAME

CROSS-REFERENCE TO RELATED APPLICATIONS

The present patent application claims priority to and is a continuation of U.S. Ser. No. 15/965,222, filed Apr. 27, 2018, which is a continuation of U.S. Ser. No. 15/797,679, filed Oct. 30, 2017, now U.S. Pat. No. 9,959,653, which is a continuation of U.S. Ser. No. 15/253,135, filed Aug. 31, 2016, now U.S. Pat. No. 9,805,489, which is a continuation of U.S. Ser. No. 14/152,366, filed Jan. 10, 2014, now U.S. Pat. No. 9,437,029, which is a continuation of U.S. Ser. No. 13/778,708, filed Feb. 27, 2013, now U.S. Pat. No. 8,660,382, which is a continuation of U.S. Ser. No. 13/317,499, filed Oct. 19, 2011, now U.S. Pat. No. 8,452,125, which is a continuation of U.S. Ser. No. 12/930,546, filed Jan. 10, 2011, now U.S. Pat. No. 8,081,841, which is a continuation of U.S. Ser. No. 11/847,125, filed Aug. 29, 2007, now U.S. Pat. No. 7,873,238, which claims priority to the provisional patent application identified by U.S. Ser. No. 60/840,992 filed on Aug. 30, 2006, the entire contents of all of which are hereby incorporated herein by reference in their entirety.

BACKGROUND OF THE INVENTION

1. Field of the Invention

The presently claimed and disclosed invention(s) relate to mosaicked oblique images and methods for making and using same. More particularly, the presently claimed and disclosed invention(s) use a methodology whereby separate obliquely captured aerial images are combined into at least one single oblique mosaic image. The at least one single oblique-mosaic image is visually pleasing and geographically accurate.

2. Background of the Art

In the remote sensing/aerial imaging industry, imagery is used to capture views of a geographic area and be able to measure objects and structures within the images as well as to be able to determine geographic locations of points within the image. These are generally referred to as "geo-referenced images" and come in two basic categories:

1. Captured Imagery—these images have the appearance they were captured by the camera or sensor employed.
2. Projected Imagery—these images have been processed and converted such that they conform to a mathematical projection.

All imagery starts as captured imagery, but as most software cannot geo-reference captured imagery, that imagery is then reprocessed to create the projected imagery. The most common form of projected imagery is the ortho-rectified image. This process aligns the image to an orthogonal or rectilinear grid (composed of rectangles). The input image used to create an ortho-rectified image is a nadir image—that is, an image captured with the camera pointing straight down.

It is often quite desirable to combine multiple images into a larger composite image such that the image covers a larger geographic area on the ground. The most common form of this composite image is the "ortho-mosaic image" which is an image created from a series of overlapping or adjacent nadir images that are mathematically combined into a single ortho-rectified image.

Each input nadir image, as well as the output ortho-mosaic image, is composed of discrete pixels (individual picture elements) of information or data. As part of the process for creating an ortho-rectified image, and hence an ortho-mosaic image, an attempt is made to reproject (move within a mathematical model) each pixel within the image such that the resulting image appears as if every pixel in the image were a nadir pixel—that is, that the camera is directly above each pixel in the image.

The reason this ortho-rectification process is needed is it is not currently possible to capture an image where every pixel is nadir to (directly below) the camera unless: (1) the camera used is as large as the area of capture, or (2) the camera is placed at an infinite distance above the area of capture such that the angle from the camera to the pixel is so close to straight down that it can be considered nadir. The ortho-rectification process creates an image that approximates the appearance of being captured with a camera where the area on the ground each pixel captures is considered nadir to that pixel, i.e. directly below that pixel. This process is done by creating a mathematical model of the ground, generally in a rectilinear grid (a grid formed of rectangles), and reprojecting from the individual captured camera image into this rectilinear grid. This process moves the pixels from their relative non-nadir location within the individual images to their nadir positions within the rectilinear grid, i.e. the image is warped to line up with the grid.

When creating an ortho-mosaic, this same ortho-rectification process is used, however, instead of using only a single input nadir image, a collection of overlapping or adjacent nadir images are used and they are combined to form a single composite ortho-rectified image known as an ortho-mosaic. In general, the ortho-mosaic process entails the following steps:

A rectilinear grid is created, which results in an ortho-mosaic image where every grid pixel covers the same amount of area on the ground.

The location of each grid pixel is determined from the mathematical definition of the grid. Generally, this means the grid is given an X and Y starting or origin location and an X and Y size for the grid pixels. Thus, the location of any pixel is simply the origin location plus the number of pixels times the size of each pixel. In mathematical terms: $X_{pixel} = X_{origin} + X_{size} \times \text{Column}_{pixel}$ and $Y_{pixel} = Y_{origin} + Y_{size} \times \text{Row}_{pixel}$.

The available nadir images are checked to see if they cover the same point on the ground as the grid pixel being filled. If so, a mathematical formula is used to determine where that point on the ground projects up onto the camera's pixel image map and that resulting pixel value is then transferred to the grid pixel. During this selection process, two important steps are taken:

When selecting the image to use to provide the pixel value, a mathematical formula is used to select an image that minimizes building lean—the effect where buildings appear to lean away from the camera. This is accomplished in a number of ways, but the most common is to pick the image where the grid pixel reprojects as close to the camera center, and hence as close to that camera's nadir point, as possible.

When determining the source pixel value to use, the ground elevation is taken into account to ensure the correct pixel value is selected. Changes in elevation cause the apparent location of the pixel to shift when captured by the camera. A point on the ground that is higher up will appear farther from the center of the image than a point on the ground in the same location that is lower down. For instance, the top of a building will appear farther from the center of an image than the bottom of a building. By taking the ground elevation into account when determining the source pixel value, the net effect is to "flatten" the image out such that changes in pixel location due to ground elevation are removed.

Because the rectilinear grids used for the ortho-mosaic are generally the same grids used for creating maps, the ortho-mosaic images bear a striking similarity to maps and as such, are generally very easy to use from a direction and orientation standpoint. However, since they have an appearance dictated by mathematical projections instead of the normal appearance that a single camera captures and because they are captured looking straight down, this creates a view of the world to which we are not accustomed. As a result, many people have difficulty determining what it is they are looking at in the image. For instance, they might see a yellow rectangle in the image and not realize what they are looking at is the top of a school bus. Or they might have difficulty distinguishing between two commercial properties since the only thing they can see of the properties in the ortho-mosaic is their roof tops, whereas most of the distinguishing properties are on the sides of the buildings. An entire profession, the photo interpreter, has arisen to address these difficulties as these individuals have years of training and experience specifically in interpreting what they are seeing in nadir or ortho-mosaic imagery.

Since an oblique image, by definition, is captured at an angle, it presents a more natural appearance because it shows the sides of objects and structures—what we are most accustomed to seeing. In addition, because oblique images are not generally ortho-rectified, they are still in the natural appearance that the camera captures as opposed to the mathematical construction of the ortho-mosaic image. This combination makes it very easy for people to look at something in an oblique image and realize what that object is. Photo interpretation skills are not required when working with oblique images.

Oblique images, however, present another issue. Because people have learned navigation skills on maps, the fact that oblique images are not aligned to a map grid, like ortho-mosaic images, makes them much less intuitive when attempting to navigate or determine direction on an image. When an ortho-mosaic is created, because it is created to a rectilinear grid that is generally a map grid, the top of the ortho-mosaic image is north, the right side is east, the bottom is south, and the left side is west. This is how people are generally accustomed to orienting and navigating on a map. But an oblique image can be captured from any direction and the top of the image is generally "up and back," meaning that vertical structures point towards the top of the image, but that the top of the image is also closer to the horizon. However, because the image can be captured from any direction, the horizon can be in any direction, north, south, east, west, or any point in between. If the image is captured such that the camera is pointing north, then the right side of the image is east and the left side of the image is west. However, if the image is captured such that the camera is pointing south, then the right side of the image is west and the left side of the image is east. This can cause confusion for someone trying to navigate within the image.

Additionally, because the ortho-mosaic grid is generally a rectilinear grid, by mathematical definition, the four cardinal compass directions meet at right angles (90-degrees). But with an oblique image, because it is still in the original form the camera captured and has not been reprojected into a mathematical model, it is not necessarily true that the compass directions meet at right angles within the image. Because in the oblique perspective, you are moving towards the horizon as you move up in the image, the image covers a wider area on the ground near the top of the image as compared to the area on the ground covered near the bottom of the image. If you were to paint a rectangular grid on the ground and capture it with an oblique image, the lines along the direction the camera is pointing would appear to converge in the distance and the lines across the direction of the camera is pointing would appear to be more widely spaced in the front of the image than they do in the back of the image. This is the perspective view we are all used to seeing—things are smaller in the distance than close up and parallel lines, such as railroad tracks, appear to converge in the distance. By contrast, if an ortho-mosaic image was created over this same painted rectangular grid, it would appear as a rectangular grid in the ortho-mosaic image since all perspective is removed as an incidental part of the ortho-mosaic process.

Because of these fundamental differences in perspective and appearance, the creation of an ortho-mosaic image by the process described above does not work well for oblique images. Because the camera's optical axis (an imaginary line through the center of the lens or optics that follows the aim of the camera) is typically pointed at an angle of 45-degrees or more from nadir (pointed 45-degrees or more up from straight down), the effects of building lean, elevation differences, and non-square pixels are all exaggerated—effects that are considered negative qualities in an ortho-mosaic image. In the ortho-mosaic industry, requirements are generally placed on the image capture process such that they limit the amount of obliqueness to as little as 5-degrees from nadir so as to minimize each of these negative effects.

In addition, if the admirable properties of an oblique image are to be maintained, namely seeing the sides of structures and the natural appearance of the images, then clearly a process that attempts to remove vertical displacements, and hence the sides of the buildings, and one that warps the image to fit a rectilinear grid is not a viable choice. A new process is needed, one which meets the following desirable qualities in an effort to preserve the admirable properties of the oblique image:

If the oblique perspective is to be maintained, the pixels cannot be aligned to a rectilinear grid, or even a trapezoidal grid. Instead, the pixels are preferably aligned to the natural perspective that a camera captures.

As part of the oblique perspective, the pixels in the image cannot all measure the same size on the ground, as pixels in the foreground of the image cover a much smaller area on the ground than pixels in the background of the image—that is by definition part of the natural perspective of a camera.

Because the pixels are so far from nadir, the effects of building lean become extreme and the standard solutions employed in the ortho-mosaic process do not do an adequate enough job compensating for this effect—new techniques must be developed to better compensate for this effect.

If the effects of changes in elevation are backed out, the resulting image has a very unnatural appearance—the vertical sides of buildings can warp and twist, which is something we are not accustomed to seeing and therefore, when looking at such an image, we have a tendency to "reject" it. Thus, to keep the buildings, structures, and objects within an image looking natural, it is preferable to leave the effects of elevation in the perspective of the image and instead account for it in another manner.

Because of these issues, the common practice in the industry is to provide oblique imagery as a series of individual images. However, some of the same benefits of the ortho-mosaic also apply to an oblique-mosaic (an image created from a collection of overlapping or adjacent oblique images), namely the fact that the mosaic covers a larger geographic area than each or any of the individual images that were used to create it. This invention details a means by which a quality oblique-mosaic can be created, overcoming the above limitations.

SUMMARY OF THE INVENTION

This invention allows for the creation of an oblique-mosaic image that has both a natural appearance and is preferably geo-referenced to maintain the ability to measure and determine geographic coordinates. While the preferred embodiment applies this invention to aerial oblique imagery, the invention will also work with non-aerial oblique imagery captured in a variety of ways, including but not limited to cameras mounted obliquely on a vertical pole, hand-held cameras aimed obliquely, and cameras mounted at oblique angles on an underwater probe.

In one embodiment, the present invention is directed to a method for creating an oblique-mosaic image from a plurality of source oblique images of a geographical area. The source oblique images are preferably captured oblique images. In this method, a desired area to be imaged and collected into an oblique-mosaic image is identified, and a mathematical model of a sensor of a virtual camera is created. The virtual camera has an elevation greater than an elevation of the area to be imaged. The mathematical model has an oblique-mosaic pixel map for the sensor of the desired area. A surface location for each pixel included in the oblique mosaic pixel map is determined and/or assigned. Then, at least one source oblique image pixel of the area to be imaged is reprojected for each pixel included in the oblique-mosaic pixel map to thereby create an oblique-mosaic image of the desired geographical area. Thus, the oblique-mosaic image is a composite image formed from pixels reprojected from multiple source oblique images.

In one version of the invention, multiple source oblique images represent the same surface location. In this embodiment, the method can further comprise steps for selecting which pixels and/or source oblique images to utilize in forming the oblique-mosaic image. For example, the method can further comprise the step of selecting source oblique images of the surface location captured at an oblique angle and compass direction similar to the oblique angle and compass direction of the virtual camera. In yet another version, the pixels of each source oblique image that represent the same surface location are compared to determine which source pixel is most representative of the surface location, the more representative pixel to be included in the oblique-mosaic image.

In one version of the invention, the step of assigning is further defined by as projecting each pixel through the perspective of the virtual camera to determine a corresponding surface location for each pixel in the oblique-mosaic pixel map.

In another version of the invention, the step of reprojecting is further defined by reprojecting the pixel to match the size and shape of the represented surface location as taken from the elevation, compass direction, and oblique angle of the virtual camera.

In yet another version of the invention, the step of reprojecting is further defined by removing the effects of elevation from the source oblique images prior to reprojection and then adding the effects of elevation to the oblique-mosaic image after reprojection.

In yet another version of the invention, the method includes the step of minimizing lean of vertical structures within the oblique mosaic image. This can be accomplished in a variety of manners, such as creating an elevation model from the source oblique images taking into account the vertical structures, and reprojecting at least one source oblique image pixel of the area to be imaged utilizing the elevation model. Alternatively, lean of vertical structures can be minimized by matching vertical structures in multiple source oblique images and shifting pixels apparent location in at least one of the source oblique images by a relative height above a ground model.

BRIEF DESCRIPTION OF THE SEVERAL VIEWS OF THE DRAWINGS

FIG. 3A is a pictorial representation of a prior art oblique-mosaic image.

FIG. 3B is an enlarged view of the pictorial representation of the prior art oblique-mosaic image of FIG. 3a.

FIG. 4A is a pictorial representation of an exemplary oblique-mosaic image created in accordance with the present invention.

FIG. 4B is an enlarged view of the pictorial representation of the exemplary oblique-mosaic image created in accordance with the present invention of FIG. 4A.

DETAILED DESCRIPTION OF THE PRESENTLY DISCLOSED AND CLAIMED INVENTION

Figure 1:
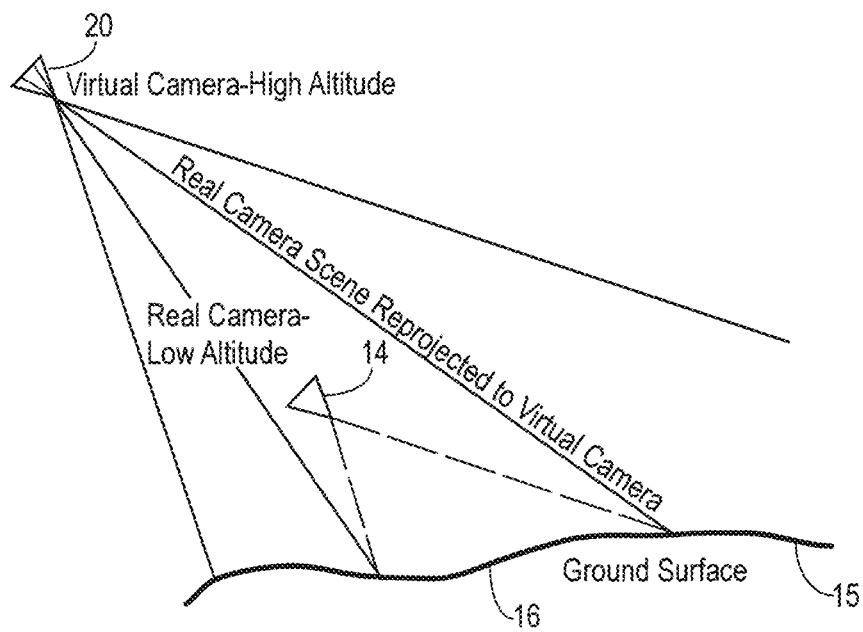
FIG. 1 is a schematic view of a real camera captured scene reprojected to a "virtual camera", i.e., a mathematical model that describes a camera larger than the real camera and higher in elevation than the real camera.

Before explaining at least one embodiment of the invention in detail, it is to be understood that the invention is not limited in its application to the details of construction, experiments, exemplary data, and/or the arrangement of the components set forth in the following description or illustrated in the drawings. The invention is capable of other embodiments or of being practiced or carried out in various ways. Also, it is to be understood that the phraseology and terminology employed herein is for purpose of description and should not be regarded as limiting.

The presently claimed and disclosed invention(s) relate to oblique-mosaic images and methods for making and using the same. More particularly, the presently claimed and disclosed invention(s) use a methodology whereby separate obliquely captured aerial images are combined into at least one single oblique-mosaic image. The at least one single oblique-mosaic image is visually pleasing and geographically accurate.

Figure 2:
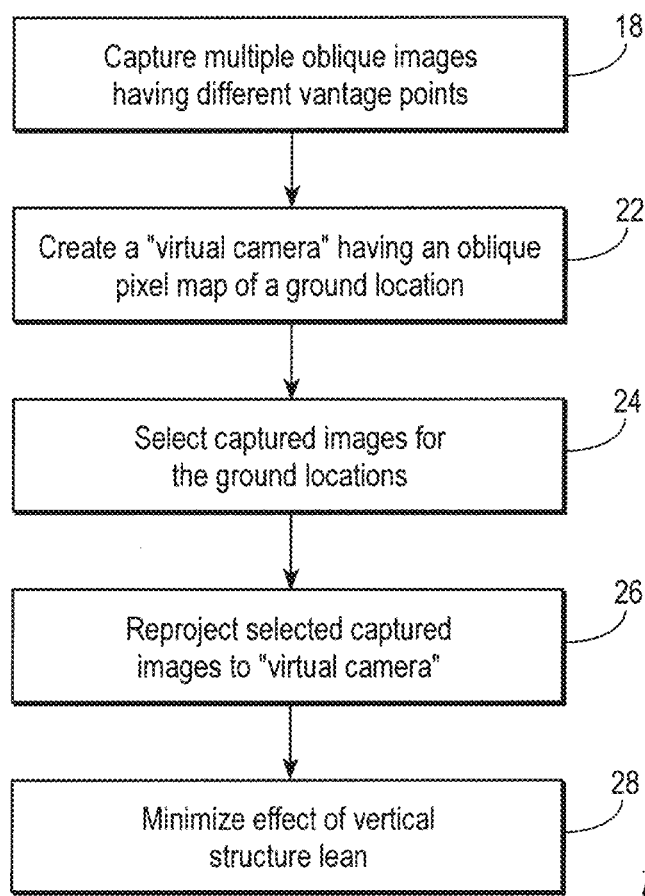
FIG. 2 is an illustration of an exemplary software/function flow chart of a method for making an oblique-mosaic image using a methodology whereby separate obliquely captured aerial images are combined into the oblique-mosaic image.

Referring now to the Figures and in particular to FIGS. 1 and 2, shown in FIG. 1 and designated by a reference numeral 10 is a schematic view of a method for creating an oblique mosaic image 12 (See FIGS. 4A and 4B). FIG. 2 is an illustration of an exemplary software/function flow chart 14 of a method for making the oblique-mosaic image 12 using a methodology whereby separate obliquely captured aerial images are combined into the oblique-mosaic image 12. FIG. 4A is a pictorial representation of an exemplary oblique-mosaic image 12 created in accordance with the present invention. FIG. 4B is an enlarged view of the pictorial representation of the exemplary oblique-mosaic image 12 created in accordance with the present invention.

In general, the method identifies a desired area 15 to be imaged and collected into the oblique-mosaic image 12. Source images are obtained utilizing a real camera 14 capturing a scene 16 as indicated by a block 18 in FIG. 2. Then, a virtual camera 20 is created as indicated by a block 22 in FIG. 2. The virtual camera 20 is a mathematical model that describes a camera larger than the real camera 14 and higher in elevation than the real camera 14 as shown in FIG. 1. The mathematical model has an oblique-mosaic pixel map for the sensor of the desired area. A surface location is assigned to each pixel included in the oblique pixel map, and then as indicated by a block 24, source oblique images are selected for the ground locations and then at least one source oblique image pixel of the area to be imaged for each pixel included in the oblique-mosaic pixel map is reprojected to thereby create the oblique-mosaic image of the desired geographical area (as indicated by a block 26). Optionally, the method further includes one or more steps to minimize the effect of vertical structure lean as indicated by a block 28.

As described hereinabove, the use of a grid reprojection methodology to create oblique-mosaic images is fraught with problems and is unlikely to provide a useable image. Therefore, in order to produce the quality oblique-mosaic image 12, an improved process must be performed. Such an improved and unique process is described and claimed herein and preferably uses, generally, the following considerations:

First, rather than projecting onto a rectilinear grid, the input image pixels are projected onto the "virtual camera" 20. The virtual camera 20 is a mathematical model that describes a very large camera, high up in the sky. Since it is a mathematical creation, this camera 20 is not bound by the current limitations of camera manufacturing.

Second, the pixels are not then reprojected to be square or even the same size in the output image, as is the case in the standard ortho-rectification process used when creating an ortho-mosaic. Instead, they are reprojected to match the size they would project onto the ground from this virtual camera 20—i.e. the natural perspective that a camera captures.

Third, in order to best align the combined imagery, the effects of changes in elevation are first backed out of the input imagery during the projection from the original input image's camera location to the ground, and then the effects of elevation are reintroduced during the projection from the ground up to the virtual camera's location. The result is a natural looking image that properly shows the contours of the land as seen from a natural oblique perspective.

Finally, the effects of building lean are desirably minimized. There are a number of different ways in which building lean can be minimized:

By "steering" the cut-lines between input images down streets such that the cut-lines do not run through a building, which can cause conflicting building lean to greatly distort the appearance of a building.

The angle of building lean can be calculated and the images warped in order to compensate for the building lean.

The buildings can be matched in adjacent images and aligned to each other.

In practice, the methodology disclosed and claimed herein, consists of multiple steps and data transformations that can be accomplished by one of ordinary skill in the art given the present specification. There are a number of algorithms already known in the art that steer cut-lines for ortho-mosaics and could be readily adapted for use with oblique images. In addition, follow-on work could create new algorithms specifically designed to deal with the complexities of oblique images.

The first step to creating the oblique-mosaic image 12 according to the presently disclosed and claimed invention requires the selection of an area to be imaged. Generally, the area to be imaged would be a specific geographical location. However, other areas can also be selected to be imaged into the oblique-mosaic image 12 such as building sides, walls, landscapes, mountain sides and the like.

Once a desired area to be imaged and collected into the oblique-mosaic image 12 has been determined, the user or operator creates the "virtual camera" 20 i.e. a mathematical construct that is capable of covering or capturing a portion of, or the entirety of the desired area. The virtual camera 20 is a mathematical model of a camera with the necessary camera geometry parameters (the mathematical values that define the camera model, for instance the number of rows and columns of the sensor plane, size of the sensor plane in millimeters, focal length in millimeters, height above ground, yaw, pitch, and roll of the optical axis) that enable it to preferably "capture" the desired scene. For instance, a virtual camera can be devised having a very large sensor (e.g. 20,000 pixel columns and 10,000 pixel rows), a standard field of view (36 mm by 24 mm sensor plane and a 60 mm focal length), and be "placed" at a relatively high altitude (e.g. 30,000 feet) looking down at an oblique angle to the north (yaw and roll of 0 and pitch of −40 degrees). In a preferred embodiment, a sensor model from a real camera is used and the user simply modifies the parameters such that it meets the requirements in order to "capture" the desired area.

The second step creates the resulting oblique pixel map for the virtual camera 20. The pixel map corresponds to the virtual camera's sensor and thus typically, but not necessarily, has the same number of rows and columns as the virtual camera's sensor. Then, for each pixel in the pixel map image, the projective equations for the virtual camera 20 are used to project each pixel downward and away from the virtual camera 20 and onto the ground, taking elevation into account when doing so (generally through the use of a mathematical elevation model of the ground surface). This results in a corresponding ground location for that virtual camera's pixel.

Once the corresponding ground location has been found, it can be used to select which previously captured images contain image data for that ground location. This is generally done by checking to see if the ground location lies within the image boundaries of a previously captured image.

When selecting source oblique images, e.g., input captured images, in order to achieve a desirable output image, it is important to use source oblique images that were captured in the same, or nearly the same, relative orientation of the virtual camera 20, in terms of oblique downward angle and compass direction of the optical axis. While it is generally not an issue to use input imagery from a camera whose model is different than the virtual camera's model, if that model is radically different (for instance, a line scanner versus a full frame capture device), it may result in an undesirable resulting image.

While this invention discusses using captured images as input to the oblique mosaic 12, it is not actually required. It is possible to use a projected image as input to this process or even to use another oblique mosaic as input to this process. However, since this process reprojects the input images, it is desirable to use non-projected input images, i.e. captured images. The reason is that reprojecting already projected data can often lead to artifacts, sort of like rounding errors in mathematical calculations. These artifacts can create an undesirable resulting oblique-mosaic.

It is generally desirable to create the continuous oblique-mosaic 12. In order to do so, there must be captured image data for the entire area being "captured" by the virtual camera 20. This means that if multiple captured images are being combined to create the oblique-mosaic 12, those input images must be adjacent or more commonly, overlapping. As a result of this overlap, it is common for there to be multiple captured images covering the same area on the ground. If multiple captured images are available for selection, a preferred captured image is chosen according to the selection criteria described below.

When multiple images from real cameras 14 cover the same point on the ground, a selection process can be used to determine which real camera image should be used as input for the creation of the virtual camera's pixel map image. This selection process can be done by assigning weights (assigned numerical values) to the following input criteria, multiplying those weights by the normalized criterion (a value that has been scaled between 0 and 1), and then selecting the image with the greatest sum of these weight/criterion products. While any number of criteria can be used, the following three criteria have been used in the development of this invention:

Selection Criterion: Distance to Optical Axis

The distance between the point on the ground being selected and the point where the input camera's optical axis intersects the ground. This value can be normalized by dividing the distance by the maximum distance able to be measured in the scene.

Selection Criterion: Angular Difference to Optical Axis

The difference between the following two angles: the angle of the input camera's optical axis (generally measured relative to the perpendicular) and the angle of the ray being cast from the virtual camera to the point on the ground being selected (again, generally measured relative to the perpendicular). This value can be normalized by dividing by 180-degrees.

Selection Criterion: Distance to Nearest Street Centerline

The distance between the point on the ground being selected and the nearest street centerline. The street centerlines can be obtained from vector data files such as TIGER files or other Geographic Information System files. This value can be normalized by dividing by the maximum distance able to be measured in the scene.

Once the preferred captured image has been selected, the projective equations for the captured image's camera are used to project from the ground up to the camera, taking the ground elevation into account when doing so. This projection through the focal point and onto the camera's sensor plane will find a pixel row and column corresponding to the point on the ground. As this typically does not fall on an integer row or column, bilinear interpolation (an industry standard mathematical formula for finding a single value from the proportionate proximity to the four surrounding pixels) is used to find the pixel value for the corresponding point on the camera's sensor plane.

This pixel value is then used to fill the pixel in the image that corresponds to the virtual camera's sensor plane from which the original ray was projected outward onto the ground. This process is repeated for some or all of the remaining pixels in the virtual camera's sensor plane, resulting in an image that covers some area or the entire area on the ground that the virtual camera 20 can "see." Preferably, this process is repeated for all of the remaining pixels in the virtual camera's sensor plane, resulting in a complete image that covers the entire area on the ground that the virtual camera 20 can "see."

The resulting image and its corresponding projective equations are then stored. The resulting image can be stored in any format, including one of many industry standard image formats such as TIFF, JFIF, TARGA, Windows Bitmap File, PNG or any other industry standard format. For the corresponding projective equations, the following data should, in a preferred embodiment, be stored as metadata with the resulting image, either appended to the same file or in another file readily accessible (an industry standard practice is to use the same filename but with a different file extension):

1. The location of the camera—generally, the location of the camera is specified by a geographic location and altitude (or height over ground).
2. The orientation of the camera—generally specified by three angles: yaw, pitch and roll (or omega, phi, and kappa).
3. The size of the sensor—generally specified as an overall sensor size in millimeters (or by the size of an individual sensor element).
4. The focal length of the lens—generally specified in millimeters.
5. Optionally, lens distortion information—generally specified as a principal point offset (offset between the optical axis and the middle of the sensor) and as radial distortion terms (polynomial coefficients that describe the amount of distortion that occurs radially out from the optical axis).
6. Optionally, a ground elevation model—generally specified as a grid of elevation values.

As discussed above, the relative perspective of the camera causes an effect known as "building lean." While building lean is most commonly applied to, and thus discussed as, buildings, it also applies to any vertical structure in the object, such as electrical towers, trees, cars, phone booths, mailboxes, street signs, and so on. Building lean is an effect that makes it appear as if buildings that are not along the optical axis of the camera "lean" away from the optical axis—the farther away from the optical axis, the greater the lean. This lean is the result of perspective, which causes objects that are raised off the ground to appear farther "back" into the image, away from the camera. Thus, the top of a building appears farther back than the bottom of a building. When this lean corresponds to the camera's perspective, it looks normal. However, as part of the oblique-mosaic process, captured images, each with their own perspective, are combined into a single virtual camera's perspective.

This combination of different perspectives becomes problematic, especially when two different captured images from different vantage points contribute pixel values to adjacent areas in the virtual camera's pixel map image. For example: If a camera to the left of a building provides the left side of a building, then that portion of the building will appear to be leaning to the right (away from the camera). If a camera that is located to the right of the building provides the right side of the building, then that portion of the building will appear to be leaning to the left. Since the two halves of the building "lean into" each other, the resulting combined image has a building that has a triangular, rather than a rectangular, appearance.

Because building lean only affects surfaces above the surface of the ground, it is generally fairly difficult to account for or correct these effects because in order to do so, the user must have knowledge of the presence of the building or structure. Features that are on the ground do not experience this building lean because the change in relative perspective is backed out when ground elevation is taken into account in the projective equations. The mathematical model used to define the ground surface during the projective process ensures the correct ground location is selected. However, for objects that rise above the ground surface, and are not represented in the mathematical model used to define the ground surface, this relative perspective change causes the virtual camera to "see" the building top in the wrong place—i.e. too far back from the camera.

A method for minimizing the effects of building lean, as contemplated herein, is to transition between one input camera image and the next input camera image over an area where there are no structures above or below the ground elevation model. In one embodiment, this is accomplished by placing the transition down the middle of a street. Thus, by having a properly weighted selection criterion for distance to street centerline, if there is a street in the area where two captured images overlap, then the transition from contributing pixels from the one captured image to contributing pixels from the second captured image will occur along this street, thus minimizing the effects of building lean.

A method for removing building lean entirely, as contemplated herein, is to provide an accurate ground elevation model taking into account buildings and other vertical structures. Thus, every pixel that comprises the image of the building is represented in the mathematical model of the ground elevation model and therefore the change in relative perspective is accounted for in the projective process. However, for this to work well, the elevation model must be highly correlated to the input imagery. If there is any shift in location between the imagery and the elevation model, then the buildings will not be projected properly when creating the oblique-mosaic image 12.

To overcome this limitation, the preferred methodology is to create the elevation model from the imagery itself. This can be done by using an industry standard process known as aero-triangulation, which finds the elevation of a point on the ground by comparing its location in two overlapping captured images and using the projective equations of their corresponding cameras to triangulate its location and elevation. Repeating this process over the entire overlap area can produce an accurate mathematical model of the surface of not only the ground, but also of the surface of structures and objects within the images. More importantly, because this model is derived from the imagery itself, it is by definition, highly correlated to the input image.

Another method for removing building lean, contemplated for use herein, is to attempt to identify vertical structures by using an edge matching process between the oblique and the corresponding nadir imagery. Vertical structures do not appear in a truly nadir image, and they barely appear in a slightly off-nadir image. Thus, when comparing an oblique image with its corresponding nadir image, the primary difference between the structures that appear in the two images will be the vertical structures. By using one or more edge detection algorithms (such as an industry standard Laplacian Filter), it is possible to identify the various structures within the two images and then isolate the vertical edges in the oblique image by subtracting out the non-vertical structures that also appear in the nadir image. Once these vertical structures have been found, the pixels for those vertical structures can be shifted to remove the effects of the change in relative perspective. By shifting the pixel's apparent location in the captured oblique image by the relative height above the ground model found through the measuring of the vertical edges, its proper ground location can be determined, thus negating the effects of building lean.

It should be understood that the processes described above can be performed with the aid of a computer system running image processing software adapted to perform the functions described above, and the resulting images and data are stored on one or more computer readable mediums. Examples of a computer readable medium include an optical storage device, a magnetic storage device, an electronic storage device or the like. The term "Computer System" as used herein means a system or systems that are able to embody and/or execute the logic of the processes described herein. The logic embodied in the form of software instructions or firmware may be executed on any appropriate hardware which may be a dedicated system or systems, or a general purpose computer system, or distributed processing computer system, all of which are well understood in the art, and a detailed description of how to make or use such computers is not deemed necessary herein. When the computer system is used to execute the logic of the processes described herein, such computer(s) and/or execution can be conducted at a same geographic location or multiple different geographic locations. Furthermore, the execution of the logic can be conducted continuously or at multiple discrete times. Further, such logic can be performed about simultaneously with the capture of the images, or thereafter or combinations thereof.

Although the foregoing invention has been described in some detail by way of illustration and example for purposes of clarity of understanding, it will be obvious to those skilled in the art that certain changes and modifications may be practiced without departing from the spirit and scope thereof, as described in this specification and as defined in the appended claims below.

What is claimed is:

1. A system for creating one or more oblique-mosaic images, comprising:
 a computer system running image processing software that when executed by the computer system causes the computer system to:
  create a mathematical model of a sensor of a virtual camera, where the virtual camera has an elevation greater than an elevation of a desired geographical area to be imaged, the mathematical model having an oblique-mosaic pixel map for the sensor of the desired geographical area;
  determine surface locations for pixels included in the oblique-mosaic pixel map, wherein the surface locations for the pixels include first surface locations of the ground and second surface locations of objects above the ground;

for the pixels included in the oblique-mosaic pixel map, select source oblique images of the surface locations of the pixels captured at an oblique angle and compass direction similar to an oblique angle and compass direction of the virtual camera; and reproject source oblique image pixels of the desired geographical area to be imaged for the pixels included in the oblique-mosaic pixel map such that reprojected pixels have differing sizes determined by matching projections from the virtual camera so as to present an oblique appearance, and thereby create an oblique-mosaic image of the desired geographical area.

2. The system of claim 1, wherein the determining the surface locations for the pixels included in the oblique-mosaic pixel map further comprises projecting the pixels in the oblique mosaic pixel map through a perspective of the virtual camera to determine a corresponding surface location for the pixels in the oblique-mosaic pixel map.

3. The system of claim 1, wherein the selecting the source oblique images comprises selecting from multiple ones of the source oblique images representing a same surface location.

4. The system of claim 3, wherein the pixels of each source oblique image that represent the same surface location are compared to determine which source pixel is most representative of the same surface location, the more representative pixel to be included in the oblique-mosaic image.

5. The system of claim 1, wherein the reprojecting the source oblique image pixels further comprises reprojecting the source oblique image pixels to match a size and shape of a represented surface location as taken from the elevation, compass direction, and oblique angle of the virtual camera.

6. The system of claim 1, wherein the reprojecting the source oblique image pixels further comprises removing effects of elevation from the source oblique images prior to reprojection and then adding the effects of elevation to the oblique-mosaic image after reprojection.

7. The system of claim 1, wherein the image processing software further causes the computer system to minimize lean of vertical structures within the oblique-mosaic image.

8. The system of claim 7, wherein the minimizing lean of the vertical structures within the oblique-mosaic image further comprises creating an elevation model from the source oblique images taking into account the vertical structures, and reprojecting at least one source oblique image pixel of the desired geographical area to be imaged.

9. The system of claim 7, wherein the minimizing lean of the vertical structures within the oblique-mosaic image further comprises matching vertical structures in multiple ones of the source oblique images and shifting pixels apparent location in at least one of the source oblique images by a relative height above a ground model.

10. The system of claim 1, wherein metadata is stored with the oblique-mosaic image.

11. The system of claim 1, wherein the oblique-mosaic image is geo-referenced.

12. The system of claim 1, wherein the selecting the source oblique images comprises selecting from multiple ones of the source oblique images representing a same surface location and having meta-data indicative of a location of a camera used to capture the source oblique images and orientation of the camera.

13. The system of claim 1, wherein the oblique-mosaic image is an aerial oblique-mosaic image.

14. A method for creating an oblique-mosaic image from a plurality of source oblique images, comprising the steps of:

creating a mathematical model of a sensor of a virtual camera, where the virtual camera has an elevation greater than an elevation of a desired geographical area to be imaged, the mathematical model having an oblique-mosaic pixel map for the sensor of the desired geographical area;

determining surface locations for pixels included in the oblique-mosaic pixel map, wherein the surface locations for the pixels include first surface locations of the ground and second surface locations of objects above the ground;

for the pixels included in the oblique-mosaic pixel map, selecting source oblique images of the surface locations of the pixels captured at an oblique angle and compass direction similar to an oblique angle and compass direction of the virtual camera; and reprojecting source oblique image pixels of the desired geographical area to be imaged for the pixels included in the oblique-mosaic pixel map such that reprojected pixels have differing sizes determined by matching projections from the virtual camera so as to present an oblique appearance, and thereby create the oblique-mosaic image of the desired geographical area.

15. The method of claim 14, wherein the step of determining is further defined by projecting the pixels in the oblique mosaic pixel map through a perspective of the virtual camera to determine a corresponding surface location for the pixels in the oblique-mosaic pixel map.

16. The method of claim 14, wherein the step of selecting is selecting from multiple source oblique images representing a same surface location.

17. The method of claim 16, wherein the pixels of each source oblique image that represent the same surface location are compared to determine which source pixel is most representative of the same surface location, the more representative pixel to be included in the oblique-mosaic image.

18. The method of claim 14, wherein the step of reprojecting is further defined by reprojecting the source oblique image pixels to match a size and shape of a represented surface location as taken from the elevation, compass direction, and oblique angle of the virtual camera.

19. The method of claim 14, wherein the step of reprojecting is further defined by removing effects of elevation from the selected source oblique images prior to reprojection and then adding the effects of elevation to the oblique-mosaic image after reprojection.

20. The method of claim 14, further comprising the step of minimizing lean of vertical structures within the oblique-mosaic image.

21. The method of claim 20, wherein the step of determining comprises:

creating a mathematical model of the first surface locations of the ground and of the second surface locations of objects above the ground in the desired geographical area, based on two or more separately captured oblique images having an overlapping image area depicting the ground and the objects above the ground in the desired geographical area, by using aero-triangulation, comprising:

for each point of a plurality of points in the overlapping image area:

comparing a first location of the point in a first one of the oblique images with a second location of the point in a second one of the oblique images; and triangulating a real-world location and elevation of the point using information indicative of one or more cameras that captured the oblique images and the comparison of the first location and the second location.

22. A system for creating one or more oblique-mosaic images, comprising:
a computer system running image processing software that when executed by the computer system causes the computer system to:
create a mathematical model of surfaces of the ground and of two or more structures in a geographical area, based on two or more separately captured oblique images having an overlapping image area and having pixels depicting the ground and the two or more structures in the geographical area, by using aero-triangulation, comprising:
for each point of a plurality of points in the overlapping image area:
comparing a first location of the point in a first one of the two or more oblique images with a second location of the point in a second one of the two or more oblique images; and
triangulating a real-world location and elevation of the point using information indicative of one or more cameras that captured the two or more oblique images and the comparison of the first location and the second location; and
reproject one or more pixels from the two or more separately captured oblique images onto the mathematical model to create an oblique-mosaic image of the geographical area, wherein the reprojected pixels have differing sizes so as to present an oblique appearance.

23. The system of claim 22, wherein the computer system runs image processing software that when executed by the computer system causes the computer system to receive a selection of the geographical area to be modeled.

24. The system of claim 22, wherein the computer system runs image processing software that when executed by the computer system causes the computer system to obtain the two or more separately captured oblique images.

25. The system of claim 22, wherein the computer system runs image processing software that when executed by the computer system causes the computer system to utilize the created mathematical model to eliminate an appearance of building lean in an oblique-mosaic image.

26. The system of claim 22, wherein one or more of the two or more separately captured oblique images are aerial oblique images.

* * * * *